United States Patent
Liu et al.

(10) Patent No.: US 9,645,731 B2
(45) Date of Patent: May 9, 2017

(54) UNLOCKING METHOD AND DEVICE USING SAME

(71) Applicant: Xiaomi Inc., Beijing (CN)

(72) Inventors: Daokuan Liu, Beijing (CN); Bin Wang, Beijing (CN); Haibin Weng, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/541,605

(22) Filed: Nov. 14, 2014

(65) Prior Publication Data

US 2015/0277697 A1    Oct. 1, 2015

Related U.S. Application Data

(63) Continuation of application No. PCT/CN2014/082905, filed on Jul. 24, 2014.

(30) Foreign Application Priority Data

Mar. 31, 2014  (CN) .......................... 2014 1 0125595

(51) Int. Cl.
*G06F 3/0488* (2013.01)
*H04M 1/673* (2006.01)

(52) U.S. Cl.
CPC ........ *G06F 3/0488* (2013.01); *G06F 3/04883* (2013.01); *H04M 1/673* (2013.01); *H04M 2250/22* (2013.01)

(58) Field of Classification Search
None
See application file for complete search history.

(56) References Cited

U.S. PATENT DOCUMENTS

| 2010/0333198 | A1* | 12/2010 | Mikake | G06F 3/03547 |
| | | | | 726/19 |
| 2012/0192268 | A1 | 7/2012 | Wang | |
| 2012/0252410 | A1* | 10/2012 | Williams | G06F 21/36 |
| | | | | 455/411 |

(Continued)

FOREIGN PATENT DOCUMENTS

| CN | 101990037 A | 3/2011 |
| CN | 102609659 A | 7/2012 |

(Continued)

OTHER PUBLICATIONS

International Search Report of PCT/CN2014/062905, from the State Intellectual Property Office of China, mailed Jan. 9, 2015.

(Continued)

*Primary Examiner* — Nalini Mummalaneni
*Assistant Examiner* — Christopher Kohlman
(74) *Attorney, Agent, or Firm* — Finnegan, Henderson, Farabow, Garrett & Dunner LLP

(57) ABSTRACT

An unlocking method for use in a terminal having a touch screen, includes: detecting a touch signal corresponding to a touch movement on the screen in a moving direction; and triggering the terminal to enter into an unlocked state, if the moving direction is the same as a preset reference direction and a number of loops of the touch movement corresponding to the touch signal is the same as a preset reference number of loops, wherein the preset reference direction is one of a clockwise direction or an anticlockwise direction.

13 Claims, 20 Drawing Sheets

(56) References Cited

U.S. PATENT DOCUMENTS

| | | | |
|---|---|---|---|
| 2013/0057496 A1* | 3/2013 | Hong | G06F 3/0488 345/173 |
| 2013/0198837 A1 | 8/2013 | Kim | |
| 2014/0066017 A1 | 3/2014 | Cho | |

FOREIGN PATENT DOCUMENTS

| | | |
|---|---|---|
| CN | 102662592 A | 9/2012 |
| CN | 103037064 A | 4/2013 |
| CN | 103049182 A | 4/2013 |
| CN | 103218144 A | 7/2013 |
| CN | 103365576 A | 10/2013 |
| CN | 103544426 A | 1/2014 |
| CN | 103677602 A | 3/2014 |
| EP | 2 148 497 A1 | 1/2010 |
| EP | 2251811 A1 | 11/2010 |
| EP | 2634681 A2 | 9/2013 |
| JP | 2003-178259 A | 6/2003 |
| JP | 2009-211436 A | 9/2009 |
| JP | 2011-517810 A | 6/2011 |
| JP | 2012-155709 A | 8/2012 |
| JP | 2012-221179 A | 11/2012 |
| JP | 2013-152641 A | 8/2013 |
| JP | 2013-178636 A | 9/2013 |
| KR | 20130037396 A | 4/2013 |
| KR | 20140030671 A1 | 3/2014 |
| RU | 2409002 C2 | 1/2011 |
| WO | WO 2013/094065 A1 | 6/2013 |

OTHER PUBLICATIONS

European Search Report for Application No. 15153367.6, from the European Patent Office, dated Apr. 7, 2015.
English translation of International Search Report of International Application No. PCT/CN2014/082905 dated Jan. 9, 2015, issued by the State Intellectual Property Office of P.R. China as ISA (2 pages).
Office Action mailed of Feb. 17, 2017, in counterpart Russian Application No. 20151362/08(055464) and English translation thereof.

* cited by examiner

UNLOCKING METHOD AND DEVICE USING SAME

CROSS-REFERENCE TO RELATED APPLICATIONS

This application is a continuation of International Application No. PCT/CN2014/082905, filed Jul. 24, 2014, which is based upon and claims priority to Chinese Patent Application No. 2014101255953, filed Mar. 31, 2014, the entire contents of all of which are incorporated herein by reference.

TECHNICAL FIELD

The present disclosure generally relates to the field of computer technology and, more particularly, to an unlocking method and a device using same.

BACKGROUND

With development of terminal technology and communication technology, terminals such as mobile phones and tablet computers are popular and become important tools in people's daily life and work. A terminal generally has a locking function, such as a function for locking a screen, an application, or the like. When a user inputs unlocking information which meets a preset unlocking condition, the terminal is switched from a lock screen state to an unlock screen state.

Conventionally, sliding gestures can used to unlock the terminal as follows. Nine reference points, arranged in three rows with three reference points each row, are displayed on a screen of the terminal. A user may set up an unlocking condition, for example, the user slides a finger over the screen and the touch movement corresponding to a touch signal passes one or more of the reference points in order. The terminal then records the reference points passed by the touch movement corresponding to the touch signal and the order thereof as the unlocking condition. The user may slide a finger over the screen to perform the unlocking, and the terminal is triggered to be unlocked if the touch movement passes the recorded reference points in the recorded order.

However, a touch trace may be left on the screen during the unlocking, so that the unlocking condition may be detected by a third party, and thus data security of the terminal is affected.

SUMMARY

According to a first aspect of the present disclosure, there is provided an unlocking method for use in a terminal having a touch screen, comprising: detecting a touch signal corresponding to a touch movement on the screen in a moving direction; and triggering the terminal to enter into an unlocked state, if the moving direction is the same as a preset reference direction and a number of loops of the touch movement corresponding to the touch signal is the same as a preset reference number of loops, wherein the preset reference direction is one of a clockwise direction or an anticlockwise direction.

According to a second aspect of the present disclosure, there is provided a terminal, comprising: a processor; a touch screen coupled to the processor; and a memory for storing instructions executable by the processor; wherein the processor is configured to: detect a touch signal corresponding to a touch movement on the screen in a moving direction; and trigger the terminal to enter into an unlocked state, if the moving direction is the same as a preset reference direction and a number of loops of the touch movement corresponding to the touch signal is the same as a preset reference number of loops; wherein the preset reference direction is one of a clockwise direction or an anticlockwise direction.

According to a third aspect of the present disclosure, there is provided a non-transitory readable storage medium storing therein instructions that, when executed by a processor of a terminal, cause the terminal to perform an unlocking method, the unlocking method comprising: detecting a touch signal corresponding to a touch movement on a screen of the terminal in a moving direction; and triggering the terminal to enter into an unlocked state, if the moving direction is the same as a preset reference direction and a number of loops of the touch movement corresponding to the touch signal is the same as a preset reference number of loops; wherein the preset reference direction is one of a clockwise direction or an anticlockwise direction.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the disclosure as recited in the appended claims.

Figure 1:
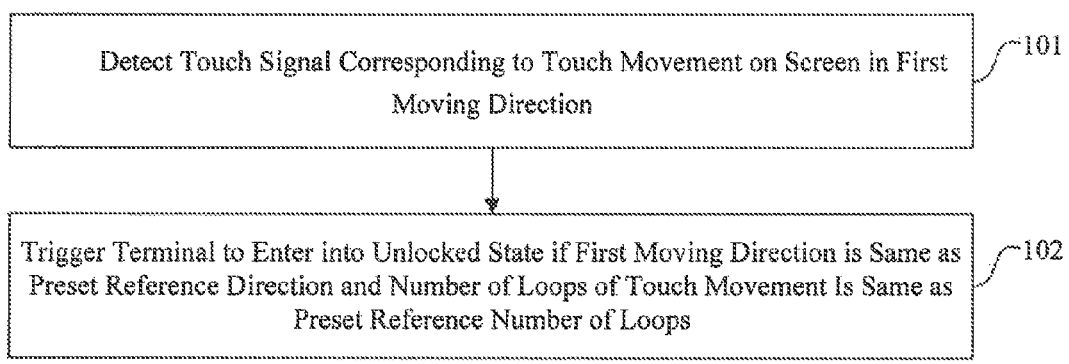
FIG. 1 is a flowchart of an unlocking method, according to an exemplary embodiment.

FIG. 1 is a flowchart of an unlocking method 100, according to an exemplary embodiment. For example, the method 100 may be used in a terminal having a touch screen, such as a mobile phone, a tablet computer, etc. Referring to FIG. 1, the method 100 includes the following steps.

In step 101, the terminal detects a touch signal corresponding to a touch movement on the screen in a first moving direction.

In exemplary embodiments, a movement path of the touch movement corresponding to the touch signal, referred to hereafter as the movement path of the touch signal, may be an arc or a polyline. The first moving direction may be, e.g., a clockwise direction or an anticlockwise direction. The touch signal is an inductive signal generated when a finger or an object touches the screen of the terminal. Since a density of induction points on the screen is generally high, the touch signal may consist of signals from a plurality of induction points. A location of the touch signal may be a location range consisting of locations of respective inductive points, or a center point of the location range, such as a geometrical center, etc.

In exemplary embodiments, if the terminal is in asleep state, the terminal can be triggered to display an interface of locked screen when a user presses, e.g., a home key or a switch of the terminal. The user may further slide a finger over the screen of the terminal in the clockwise direction or the anticlockwise direction according to a preset unlocking condition. At this time, the terminal detects the touch signal generated due to the touch applied from the finger, and the touch signal indicates the touch movement in the clockwise direction or the anticlockwise direction.

In step 102, if the first moving direction is the same as a preset reference direction and a number of loops of the touch movement corresponding to the touch signal is the same as a preset reference number of loops, the terminal is triggered to enter into an unlocked state.

In exemplary embodiments, the preset reference direction may be a clockwise direction or an anticlockwise direction. The reference direction and the reference number of loops may be preset through a system program or an application program of the terminal, or be preset by the user. The unlocked state may be a state after unlocking information is successfully verified. The unlocking information may be information in the touch signal or a password input by the user. The unlocked state may be a state after the locked screen is unlocked or an application installed on the terminal is unlocked, or a state that a password transaction is successfully performed, etc.

In exemplary embodiments, the terminal may determine whether one or more unlocking conditions are met when the touch signal disappears or during the touch signal being generated. The unlocking conditions may include, e.g., a first condition that the first moving direction is the same as the reference direction; and a second condition that the number of loops of the movement corresponding to the touch signal is the same as the reference number of loops. If both of the conditions are met, the terminal may be triggered to enter into the unlocked state. For example, the terminal enters into the unlocked state from the locked screen state. If either condition is not met, the terminal remains in the current state, i.e., the terminal is prevented from entering into the unlocked state.

In exemplary embodiments, the terminal determines whether the number of loops of the movement corresponding to the touch signal is the same as the preset reference number of loops in at least one of a first manner or a second manner.

In the first manner, if the movement path of the touch signal is continuous and forms at least one closed shape, and a number of the formed closed shapes is the same as the reference number of loops, it is determined that the number of loops of the touch movement corresponding to the touch signal is the same as the reference number of loops.

Each closed shape may be a regular shape such as a polygon, a water drop shape, a circle or the like, or an irregular shape.

Figure 2A:
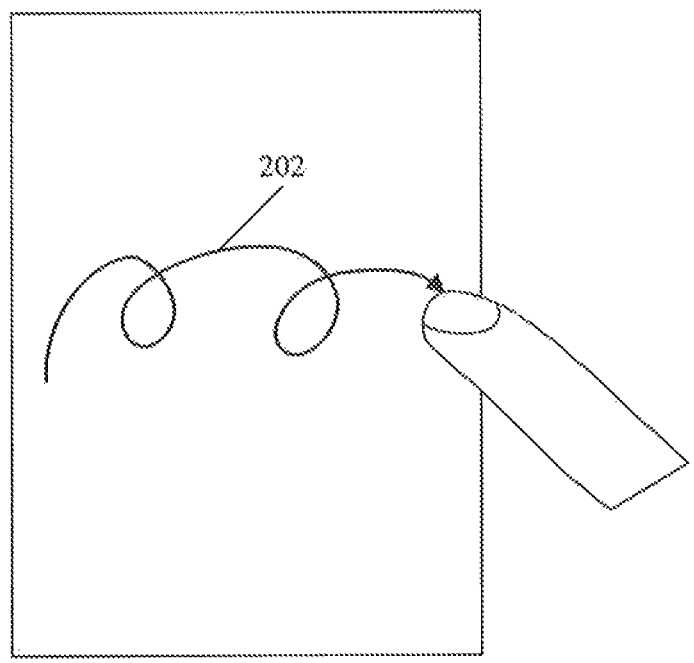
FIGS. 2a-2d, 3a-3c, 4a-4f, and 5a-5d are schematic diagrams each showing a touch movement corresponding to a touch signal, according to exemplary embodiments.
Figure 2B:
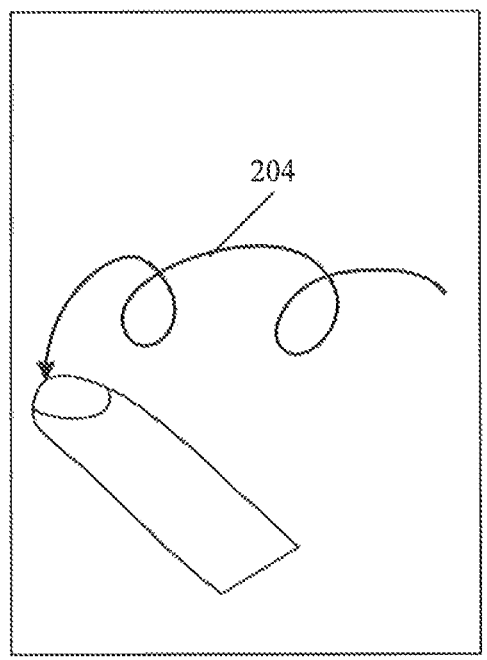

FIGS. 2a and 2b are schematic diagrams showing movement paths 202 and 204 of the touch signal, respectively, according to exemplary embodiments. The movement path 202 (FIG. 2a) is in a clockwise direction, and the movement path 204 (FIG. 2b) is in an anticlockwise direction. The terminal may record the number of the closed shapes formed by the continuous movement path. If the recorded number is the same as the reference number of loops, it is determined that the number of loops of the touch movement corresponding to the touch signal is the same as the reference number of loops. The recording process may be as follows. If it is detected that the movement path of the touch signal forms one closed shape, the recorded number of the closed shapes is increased by one, and the movement path previously determined is removed. The above detection process is repeated for subsequent movement paths until the touch signal disappears. Thus, the resulting number of the closed shapes recorded can be obtained.

In the second manner, if a cumulative value of angular variations of a moving direction of the touch movement corresponding to the touch signal is in a preset reference angular range, it is determined that the number of loops of the touch movement corresponding to the touch signal is the same as the reference number of loops.

For example, a lower limit of the preset reference angular range is a product of the reference number of loops and a circumferential angle, and an upper limit of the preset reference angular range is a product of a sum of the reference number of loops and one and the circumferential angle, wherein the circumferential angle may be 360°. For example, if the reference number of loops is 2, the preset reference angular range may be 720° (2×360°) to 1080° (3×360°).

Figure 2C:
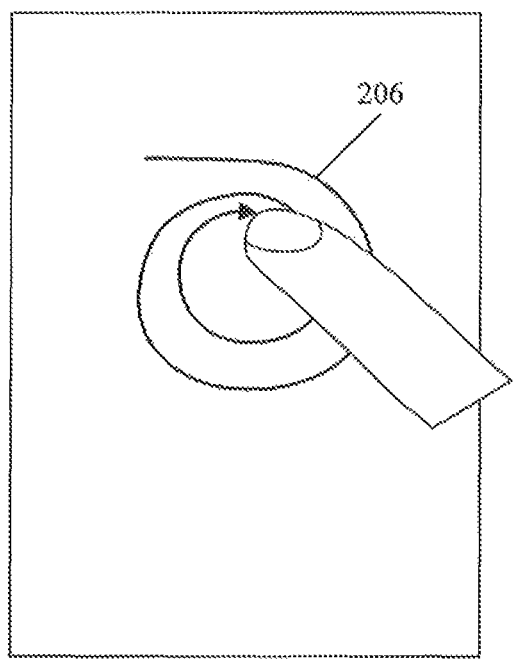
Figure 2D:
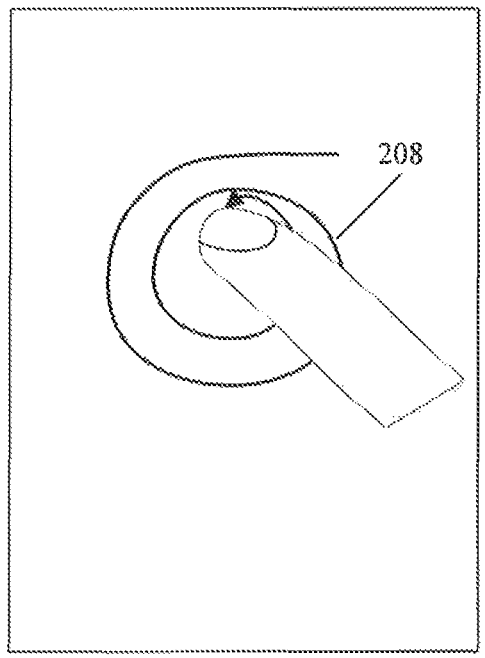

FIGS. 2c and 2d are schematic diagrams showing movement paths 206 and 208 of the touch signal, respectively, according to exemplary embodiments. The movement path 206 (FIG. 2c) is in a clockwise direction, and the movement path 208 (FIG. 2d) is in an anticlockwise direction. The terminal may detect the moving direction of the touch signal in real time, so as to record the cumulative value of angular variations of the moving direction. Each 360° change in the moving direction indicates that the touch signal moves one loop. When the touch signal disappears, the cumulative value of the recorded angular variations may be obtained. If the cumulative value of the recorded angular variation is in the reference angular range, it may be determined that the number of loops moved by the touch signal is the same as the reference number of loops.

In addition to the first and second unlocking conditions described above, the terminal can be triggered to enter into the unlocked state based on additional unlocking conditions, e.g., based on at least one reference point displayed on the screen.

In exemplary embodiments, the terminal is triggered to enter into the unlocked state, if the first moving direction is the same as the preset reference direction, the number of loops of the touch movement corresponding to the touch signal is the same as the preset reference number of loops, and a number of reference points passed by the touch movement corresponding to the touch signal (referred to hereafter as the number of reference points passed by the touch signal) is the same as a preset reference number of reference points.

The number of reference points and a location of each reference point may be randomly set. The reference number of reference points may be preset by the system program or the application program of the terminal, or may be set by the user.

Figure 3A:
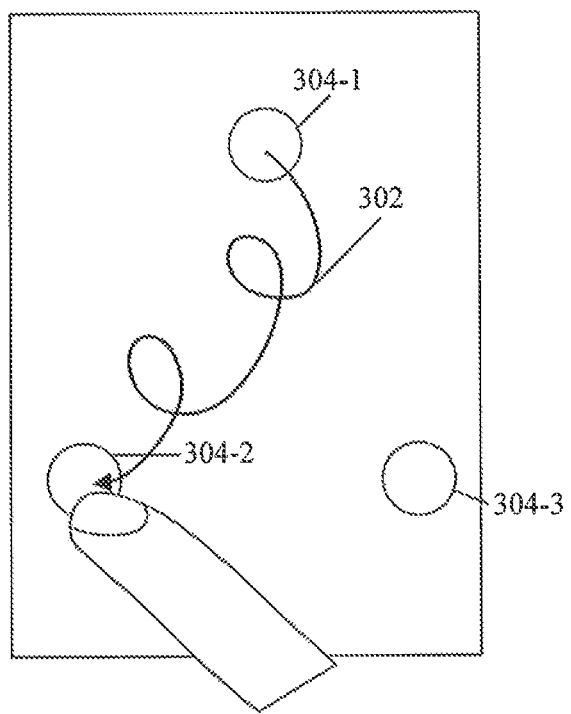
Figure 3B:
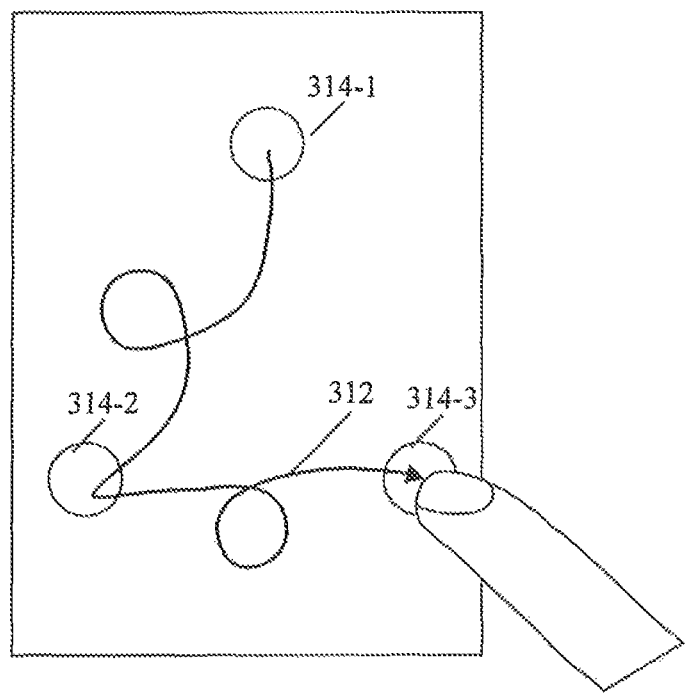
Figure 3C:
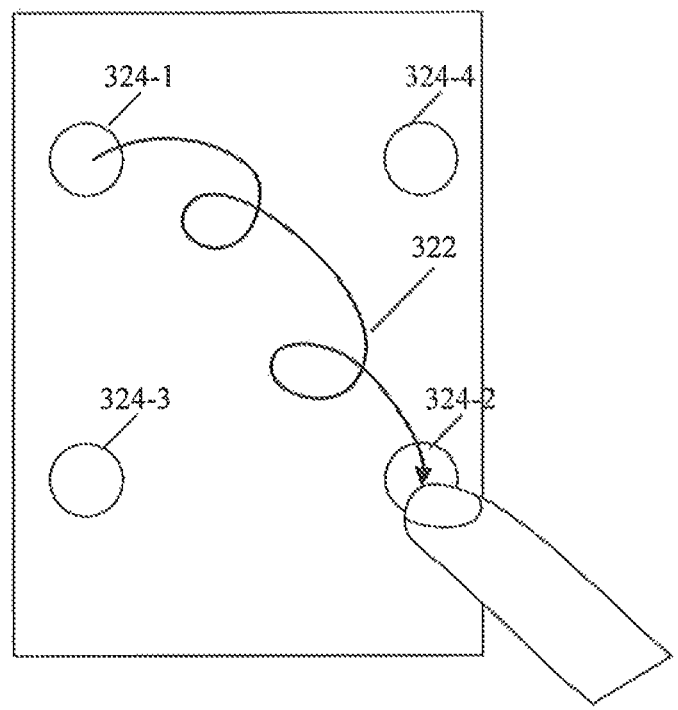

In the embodiments, when the user performs an unlocking operation by moving a finger a number of loops in the first moving direction, the movement path passes a number of reference points, for example, any two of three reference points. FIGS. 3a-3c, are schematic diagrams showing movement paths 302, 312, and 322 of the touch signal, respectively, according to exemplary embodiments. For example, FIG. 3a shows that the movement path 302 passes two points 304-1 and 304-2 of three reference points 304-1, 304-2, and 304-3; FIG. 3b shows that the movement path 312 passes all of three reference points 314-1, 314-2, and 314-3; and FIG. 3c shows that the movement path 322 passes two points 324-1 and 324-2 of four reference points 324-1, 324-2, 324-3, and 324-4.

In exemplary embodiments, a start point and/or an end point may be set in the reference points, i.e., a first reference point and/or a second reference point may be included in the reference points, the first reference point being the start point and the second reference point being the end point. Correspondingly, the terminal can be triggered to enter into the unlocked state, if the first moving direction is the same as the preset reference direction, the number of loops of the touch movement corresponding to the touch signal is the same as the preset reference number of loops, the number of reference points passed by the touch signal is the same as the preset reference number, and the touch signal meets at least one of a preset start condition or a preset end condition.

The start condition is that an initial location of the touch signal is a location of the first reference point; and the end condition is that a last reference point passed by the touch signal after the number of loops is the second reference point. The initial location of the touch signal can be a location at which the touch signal is generated initially.

Figure 4A:
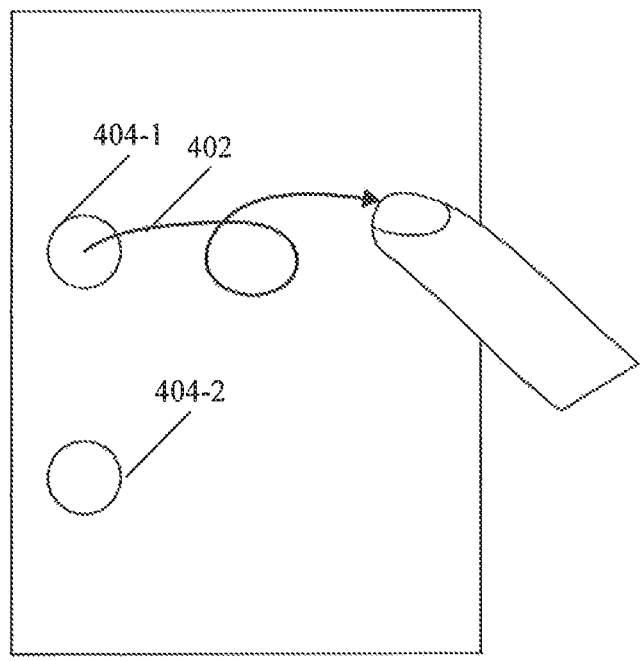
Figure 4B:
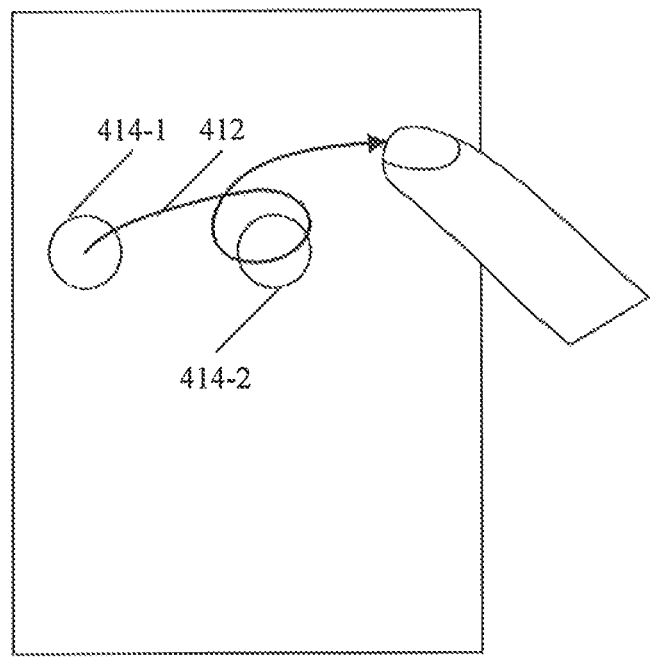

In one exemplary embodiment, the first reference point in the reference points is set as the start point, and the terminal is triggered to enter into the unlocked state also based on the initial condition. Accordingly, the first reference point is displayed with a specific mark for marking the first reference point as the start point. For example, a word "start" or a specific color such as a red color may be displayed at the first reference point. When the user performs an unlocking operation by sliding a finger over the screen, the finger is applied on the first reference point firstly and is then moved a number of loops in the first moving direction, during which the movement path passes a number of reference points. FIGS. 4a and 4b are schematic diagrams of movement paths 402 and 412 of the touch signal, according to exemplary embodiments. For example, FIG. 4a shows that the movement path 402 passes a reference point 404-1 of two reference points 404-1 and 404-2, and the reference point 404-1 is the start point. Also for example, FIG. 4b shows that the movement path 412 passes both of reference points 414-1 and 414-2 and the reference point 414-1 is the start point.

Figure 4C:
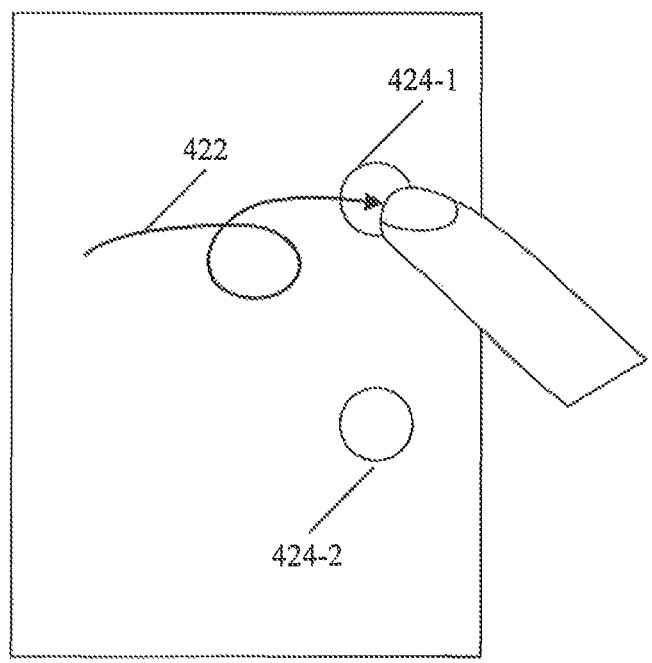
Figure 4D:
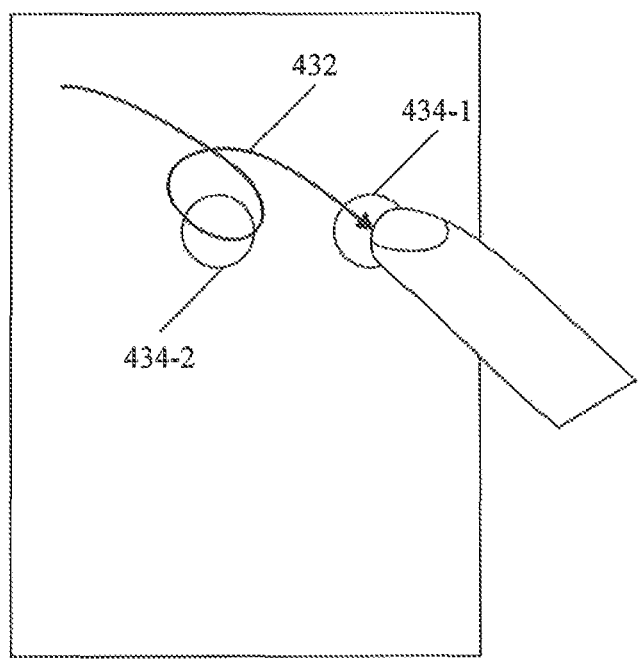

In one exemplary embodiment, the second reference point in the reference points is set as the end point, and the terminal is triggered to enter into the unlocked state also based on the end condition. Accordingly, the second reference point is displayed with a specific mark for marking the second reference point as the end point. For example, a word "end" or a specific color such as a blue color may be displayed at the second reference point. When the user performs an unlocking operation by sliding a finger over the screen, the finger is moved a number of loops in the first moving direction, and the movement path passes a number of reference points. The finger finally slides on the second reference point after the number of loops. FIGS. 4c and 4d are schematic diagrams of movement paths 422 and 432 of the touch signal, according to exemplary embodiments. For example, FIG. 4c shows that the movement path 422 passes a reference point 424-1 of two reference points 424-1 and 424-2, and the reference point 424-1 is the end point. Also for example, FIG. 4d shows that movement path 424 passes both of two reference points 434-1 and 434-2, and the reference point 434-1 is the end point.

Figure 4E:
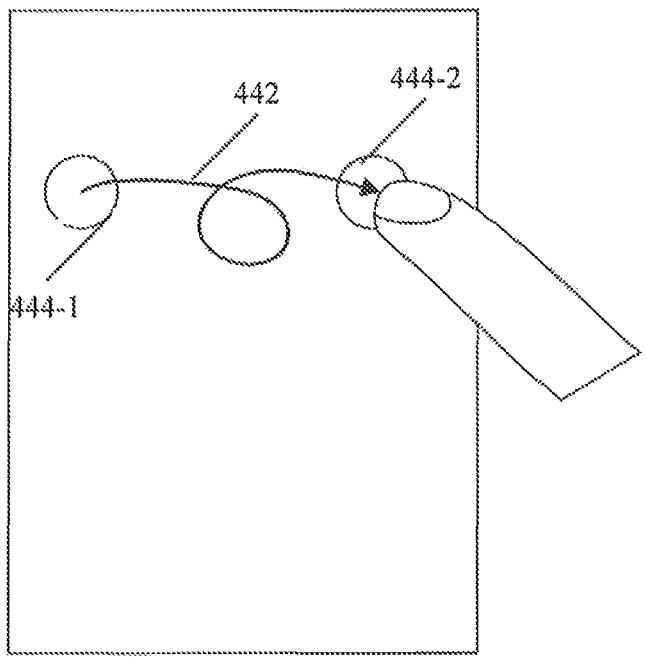
Figure 4F:
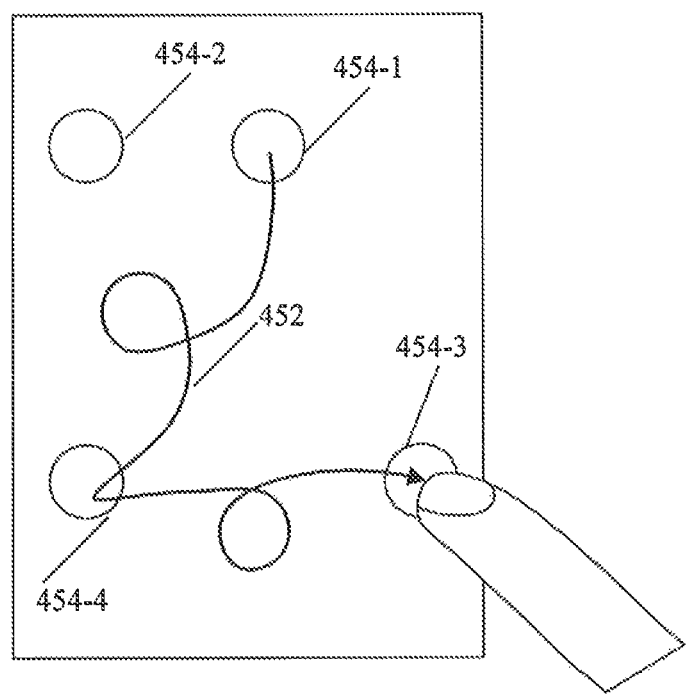

In one exemplary embodiment, the first reference point and the second reference point in the reference points are set as the start point and the end point, respectively, and the terminal is triggered to enter into the unlocked state also based on the initial condition and the end condition. Accordingly, the first and second reference points may be displayed with specific marks for respectively marking the first and second reference points as the start point and the end point. For example, the words "start" and "end," or different colors may be displayed at the first reference point and the second reference point, respectively. Also for example, the first reference point is displayed as a red point and the second reference point is displayed as a blue point. When the user performs an unlocking operation by sliding a finger over the screen, the finger is applied firstly on the first reference point, and then is moved a number of loops in the first moving direction, during which the movement path passes a number of reference points. The finger finally slides on the second reference point after the number of loops. FIGS. 4e and 4f are schematic diagrams of movement paths 442 and 452 of the touch signal, according to exemplary embodiments. For example, FIG. 4e shows that the movement path 442 passes both of two reference points 444-1 and 444-2 and the reference points 444-1 and 444-2 are respectively the start point and the end point. Also for example, FIG. 4f shows that the movement path 452 passes three reference points 454-1, 454-4, and 454-3 of four reference points 454-1, 4542, 454-3, and 454-4, and the reference points 454-1 and 454-3 are the start point and the end point, respectively.

In exemplary embodiments, the terminal is triggered to enter into the unlocked state, if the first moving direction is the same as the preset reference direction, the number of loops of the touch movement corresponding to the touch signal is the same as the preset reference number of loops, and the touch signal passes all preset basis reference points displayed on the screen.

In exemplary embodiments, a basis reference point is a reference point which a touch signal is required to pass for triggering the terminal to enter into the unlocking state, and may be preset in the system program or the application program of the terminal, or may be set by a user.

In one exemplary embodiment, at least one reference point is displayed on the screen according to a display location of the at least one reference point. In the embodiment, locations of reference points may be fixed. For example, nine reference points are arranged into three rows with each row having three reference points. Also for example, all of the reference points are arranged on a circle, etc.

In one exemplary embodiment, at least one reference point is displayed on the screen, and identity information of the at least one reference point is displayed correspondingly. The identity information of a reference point may be an index number, a color and the like, which differentiates the reference point from other reference points. The location of each reference point may be fixed or random.

Figure 5A:
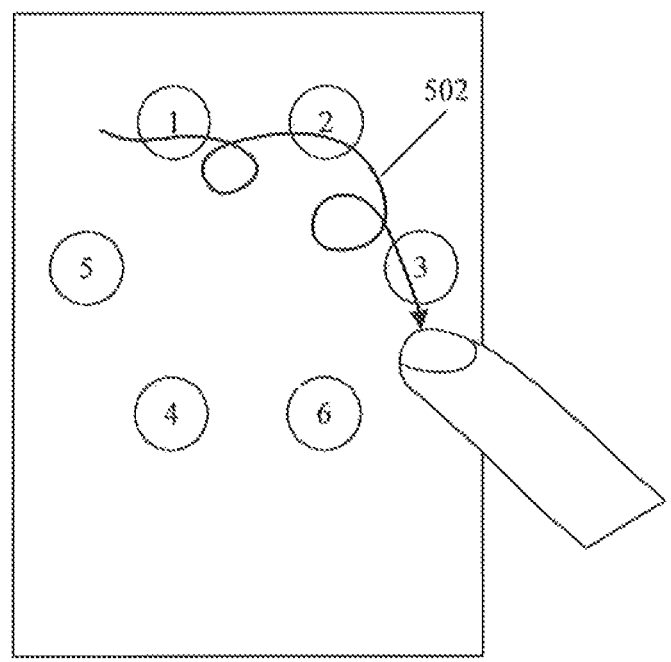
Figure 5B:
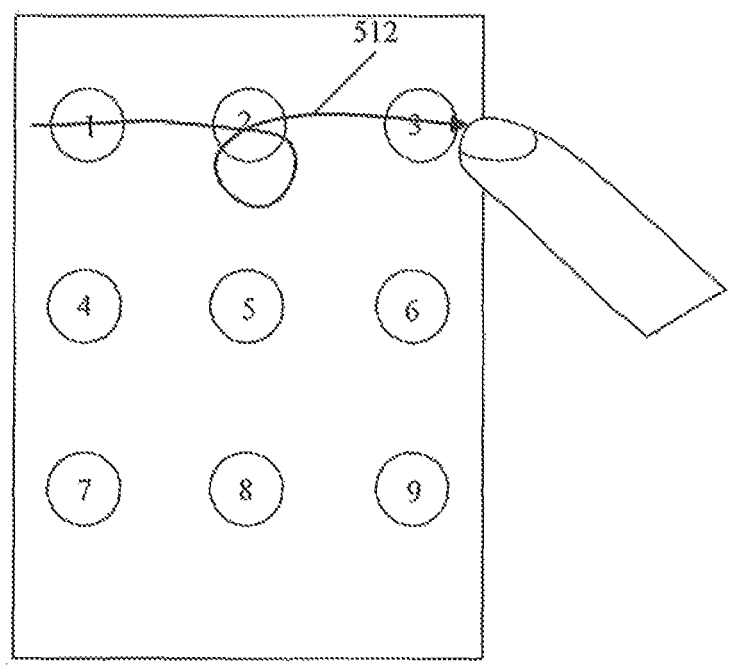

In exemplary embodiments, when the user performs an unlocking operation by sliding a finger over the screen, the finger is moved a number of loops in the first moving direction and the movement path passes all of basis reference points included in the displayed reference points. FIGS. 5a and 5b are schematic diagrams of movement paths 502 and 512 of the touch signal, according to exemplary embodiments. For example, FIG. 5*a* shows six reference points 1, 2, 3, 4, 5, and 6 displayed on the screen, wherein the reference points 1, 2, and 3 are basis reference points. In this example, for the terminal to be triggered to enter into the unlocked state, the movement path 502 needs to pass the basis reference points 1, 2, and 3. Also for example, FIG. 5*b* shows nine reference points 1, 2, 3, . . . , and 9 displayed on the screen in three rows with each row having three reference points, wherein the reference points 1, 2, and 3 in the upper row are basis reference points. In this example, for the terminal to be triggered to enter into the unlocked state, the movement path 512 needs to pass the basis reference points 1, 2, and 3. In the above embodiments, there is no limitation on an order of basis reference points which the movement path passes.

In other embodiments, the terminal is triggered to enter into the unlocked state based on, among other things, the order of basis reference points which the movement path passes. For example, for the terminal to be triggered to enter into the unlocked state, the touch signal passes all of preset basis reference points in displayed reference points and the order of basis reference points the movement path passes needs to match a preset order of basis reference points. The preset order of basis reference points may be preset by the system program or an application program in the terminal, or may be set by the user.

Figure 5C:
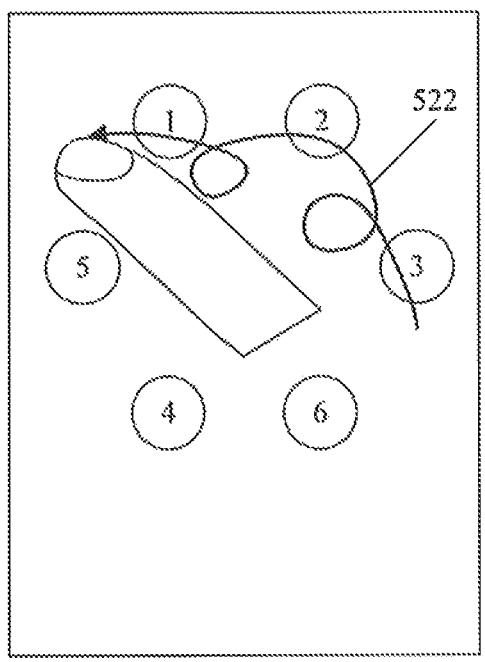
Figure 5D:
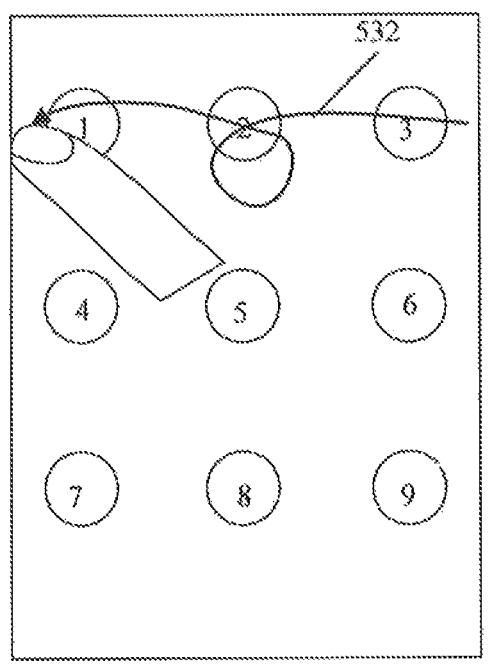

In exemplary embodiments, when the user performs an unlocking operation by sliding a finger over the screen, the finger is moved a number of loops in the first moving direction and the movement path passes all of basis reference points in displayed reference points in an order. FIGS. 5*c* and 5*d* are schematic diagrams of movement paths 522 and 532 of the touch signal, according to exemplary embodiments. For example, FIG. 5*c* shows six reference points 1, 2, 3, 4, 5 and 6 displayed on the screen, of which the reference points 1, 2 and 3 are basis reference points. In this example, the preset order of basis reference points is 3, 2, 1, and for the terminal to be triggered to enter into the unlocked state, the movement path 522 needs to pass the basis reference points in the order of 3, 2, 1. Also for example, FIG. 5*d* shows are nine reference points 1, 2, 3, . . . , and 9 displayed on the screen in three rows with each row having three reference points, of which the reference points 1, 2, and 3 are basis reference points. In this example, the preset order of basis reference points is 3, 2, 1, and for the terminal to be triggered to enter into the unlocked state, the movement path 532 needs to pass the basis reference points in the order of 3, 2, 1.

In exemplary embodiments, a start point and/or an end point may be set in the reference points, i.e., the reference points may include a first reference point and/or a second reference point, wherein the first reference point is the start point and the second reference point is the end point. Correspondingly; the terminal is triggered to enter into the unlocked state, if the first moving direction the same as the preset reference direction, the number of loops of the movement of the touch signal is the same as the preset reference number of loops, the movement path passes all of basis reference points in the displayed reference points, and the touch signal meets at least one of an initial condition and/or an end condition. The initial condition is that a start location of the touch signal is at the first reference point; and the end condition is that a last reference point passed by the touch signal after the number of loops is the second reference point.

Embodiments of the present disclosure also provide a method for setting the above described parameters, including the first moving direction, the number of loops, the number of reference points, the arrangement of the reference points, the angular range, etc. For example, a parameter setting instruction, which carries a target value of a parameter to be set, is received, and the target value is set as a value of the parameter.

In exemplary embodiments, a setting page may be set in the system program or the application program for setting the above parameters. The setting page may be provided with setting items of respective parameters. The setting item of each parameter may include an on-off button of the parameter. The first moving direction and the number of loops may be enabled by default. The setting item may also include a setting column of a parameter which may be set in various user setting manners such as selecting from a pull-down menu, manually inputting values, simulation of a sliding operation and the like. In addition, the setting item may also include a button for restoring default values.

The method 100 improves complexity of a touch operation, and reduces a chance that a touch trace left on the screen of the terminal is detected by a third party. Thus, data security of the terminal is improved.

Figure 6:
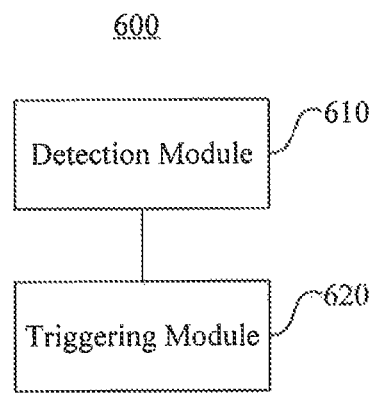
FIG. 6 is a block diagram of a device having an unlocking function, according to an exemplary embodiment.

FIG. 6 is a block diagram of a device 600 for unlocking a terminal, according to an exemplary embodiment. For example, the device 600 may be a component of the terminal, or the terminal. Referring to FIG. 6, the device 600 includes a detecting module 610 configured to detect a touch signal corresponding to a touch movement on a screen of the terminal in a first moving direction; and a triggering module 620 configured to trigger the terminal to enter into an unlocked state if the first moving direction is the same as a preset reference direction and a number of loops of the touch movement corresponding to the touch signal is the same as a preset reference number of loops. The preset reference direction may be a clockwise direction or an anticlockwise direction.

In exemplary embodiments, the device 600 also includes a display module (not shown) configured to display at least one reference point on the screen. The triggering module 620 is configured to trigger the terminal to enter into the unlocked state, if the first moving direction is the same as the preset reference direction, the number of loops of the touch movement corresponding to the touch signal is the same as the preset reference number of loops, and the number of reference points passed by the touch signal is the same as a preset reference number.

In exemplary embodiments, the at least one reference point may include a first reference point and/or a second reference point. The triggering module 620 is configured to trigger the terminal to enter the unlocked state, if the first moving direction is the same as the preset reference direction, the number of loops of the touch movement corresponding to the touch signal is the same as the preset reference number of loops, the number of reference points passed by the touch signal is the same as a preset reference number, and the touch signal meets a preset initial condition and/or a preset end condition.

The initial condition is that an initial location of the touch signal is a location of the first reference point; and an end condition is that a last reference point passed by the touch signal after the number of loops is the second reference point.

In exemplary embodiments, the triggering module 620 is configured to trigger the terminal to enter into the unlocked state, if the first moving direction is the same as the preset reference direction, the number of loops of the touch movement corresponding to the touch signal is the same as the preset reference number of loops, and the touch signal passes all preset basis reference points in the displayed at least one reference point.

In exemplary embodiments, the triggering module 620 is configured to trigger the terminal to enter into the unlocked state, if the first moving direction is the same as the preset reference direction, the number of loops of the touch movement corresponding to the touch signal is the same as the preset reference number of loops, the touch signal passes all preset basis reference points in the displayed at least one reference point, and an order in which the touch signal passes the basis reference points is the same as a preset order of basis reference points In exemplary embodiments, the display module is configured to display at least one reference point on the screen according to a location of the at least one reference point.

In exemplary embodiments, the display module is configured to display on the screen at least one reference point and corresponding identity information of the at least one reference point.

In exemplary embodiments, the at least one reference point may include a first reference point and a second reference point. The triggering module 620 is configured to trigger the terminal to enter into the unlocked state, if the first moving direction is the same as the preset reference direction, the number of loops of the touch movement corresponding to the touch signal is the same as the preset reference number of loops, the touch signal passes all preset basis reference points in the displayed at least one reference point, and the touch signal meets the preset initial condition and/or the end condition described above.

Figure 7:
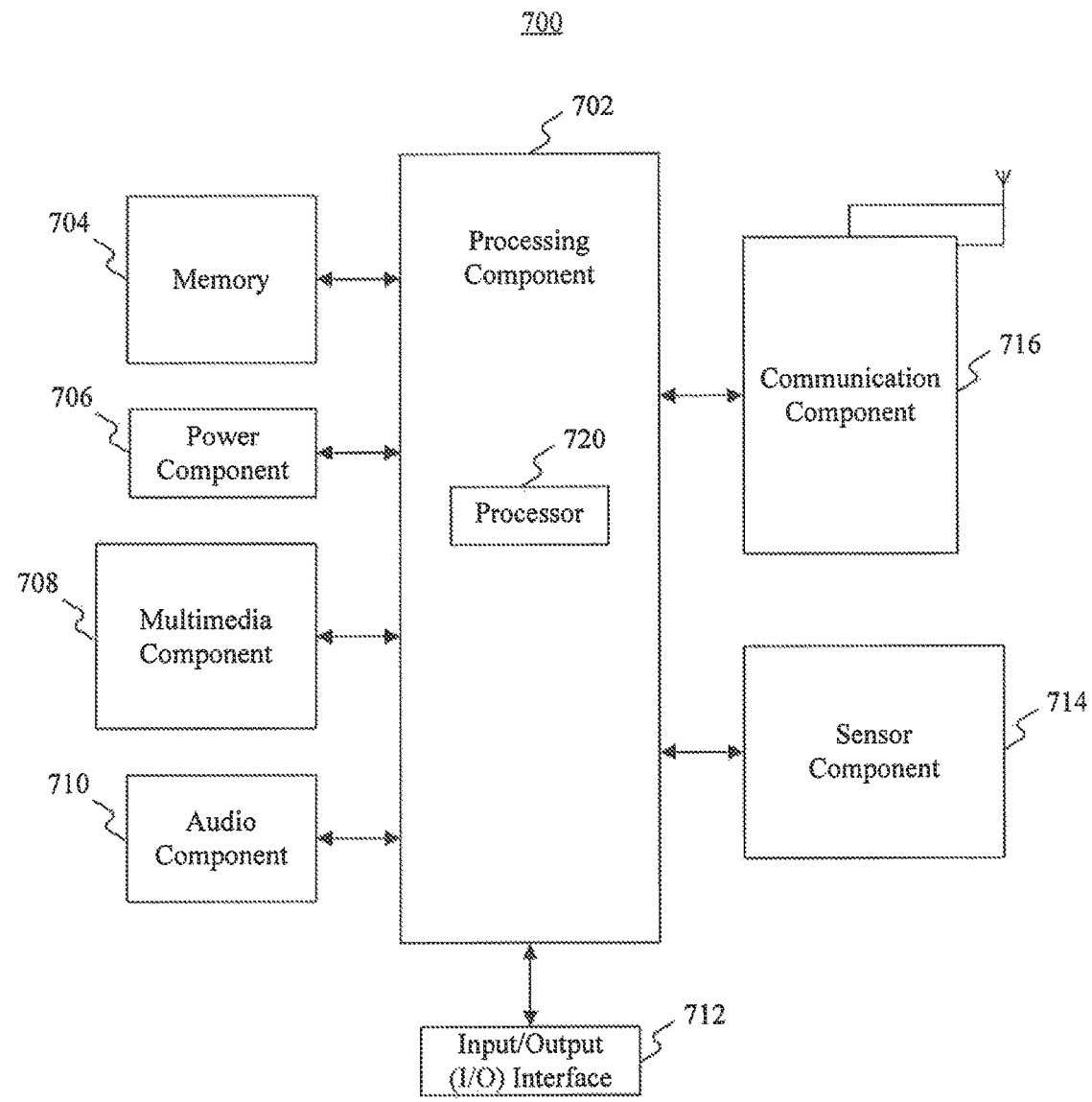
FIG. 7 is a block diagram of a terminal, according to an exemplary embodiment.

FIG. 7 is a block diagram of a terminal 700, according to an exemplary embodiment. For example, the terminal 700 may be a mobile phone, a computer, a digital broadcasting terminal, a messaging device, a game console, a tablet device, a medical device, an excise equipment, a personal digital assistant, etc.

Referring to FIG. 7, the terminal 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the terminal 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the terminal 700. Examples of such data include instructions for any applications or methods operated on the terminal 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the terminal 700. The power component 706 may include a power management system, one or more power sources, and any other components associated with the generation, management, and distribution of power in the terminal 700.

The multimedia component 708 includes a screen providing an output interface between the terminal 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 708 includes a front camera and/or a rear camera. The front camera and the rear camera may receive an external multimedia datum while the terminal 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the terminal 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, an initialing button, and a locking button.

The sensor component 714 includes one or more sensors to provide status assessments of various aspects of the terminal 700. For instance, the sensor component 714 may detect an open/closed status of the terminal 700, relative positioning of components, e.g., the display and the keypad, of the terminal 700, a change in position of the terminal 700 or a component of the terminal 700, a presence or absence of user contact with the terminal 700, an orientation or an acceleration/deceleration of the terminal 700, and a change in temperature of the terminal 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the terminal 700 and other devices. The terminal 700 can access a wireless network based on a communication standard, such as WiFi, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 704, executable by the processor 720 in the terminal 700, for performing the above-described methods. For example, the non-transitory computer-readable storage medium may be a ROM, a RAM, a CD-ROM, a magnetic tape, a floppy disc, an optical data storage device, and the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An unlocking method for use in a terminal having a touch screen, comprising:
   displaying at least one reference point on the screen;
   detecting a touch signal corresponding to a touch movement on the screen in a moving direction; and
   triggering the terminal to enter into an unlocked state, if the moving direction is the same as a preset reference direction, a number of loops of the touch movement corresponding to the touch signal is the same as a preset reference number of loops, and a number of reference points passed by the touch movement corresponding to the touch signal is the same as a preset reference number of reference points, the number of reference points being greater than one, wherein:
   the preset reference direction is one of a clockwise direction or an anticlockwise direction, and
   a determination of whether the number of loops of the touch movement is the same as the preset reference number of loops and a determination of whether the number of reference points passed by the touch movement is the same as the preset reference number of reference points are independent of each other.

2. The method according to claim 1, wherein the at least one reference point includes at least one of a first reference point or a second reference point, the triggering of the terminal to enter into the unlocked state further comprising:
   triggering the terminal to enter into the unlocked state, if the moving direction is the same as the preset reference direction, the number of loops of the touch movement corresponding to the touch signal is the same as the preset reference number of loops, the number of reference points passed by the touch movement corresponding to the touch signal is the same as the preset reference number of reference points, and the touch signal meets at least one of a first condition or a second condition;
   wherein the first condition is that an initial location of the touch movement corresponding to the touch signal is a location of the first reference point, and the second condition is that a last reference point passed by the touch movement corresponding to the touch signal after the number of loops is the second reference point.

3. The method according to claim 1, wherein the triggering of the terminal to enter into the unlocked state further includes:
   triggering the terminal to enter into the unlocked state, if the moving direction is the same as the preset reference direction, the number of loops of the touch movement corresponding to the touch signal is the same as the preset reference number of loops, and the touch movement corresponding to the touch signal passes all preset basis reference points in the displayed at least one reference point.

4. The method according to claim 3, wherein the triggering of the terminal to enter into the unlocked state further comprises:
   triggering the terminal to enter into the unlocked state, if the moving direction is the same as the preset reference direction, the number of loops of the touch movement corresponding to the touch signal is the same as the preset reference number of loops, the touch movement corresponding to the touch signal passes all preset basis reference points in the displayed at least one reference point, and an order in which the touch movement corresponding to the touch signal passes the basis reference points is the same as a preset order of basis reference points.

5. The method according to claim 1, wherein the displaying of the at least one reference point on the screen comprises:
   displaying the at least one reference point on the screen according to a preset display location.

6. The method according to claim 1, wherein the displaying of the at least one reference point on the screen comprises:
   displaying on the screen the at least one reference point and corresponding identity information of the at least one reference point.

7. The method according to claim 1, wherein the at least one reference point includes at least one of a first reference point or a second reference point, the triggering of the terminal to enter into the unlocked state further comprising:
triggering the terminal to enter into the unlocked state if the moving direction is the same as the preset reference direction, the number of loops of the touch movement corresponding to the touch signal is the same as the preset reference number of loops, the touch movement corresponding to the touch signal passes all preset basis reference points in the displayed at least one reference point, and the touch signal meets at least one of a first condition or a second condition;
wherein the first condition is an initial location of the touch movement corresponding to the touch signal is a location of the first reference point, and the second condition is that a last reference point passed the touch movement corresponding to the touch signal after the number of loops is the second reference point.

8. The method according to claim 1, wherein the terminal determines that the number of loops of the touch movement corresponding to the touch signal is the same as the preset reference number of loops by determining that:
the touch movement is continuous and forms at least one closed shape, and a number of the formed closed shapes is the same as the reference number of loops.

9. The method according to claim 1, wherein the terminal determines that the number of loops of the touch movement corresponding to the touch signal is the same as the preset reference number of loops by determining that:
a cumulative value of angular variations of the touch movement corresponding to the touch signal is in a preset reference angular range, a lower limit of the preset reference angular range being a product of the preset reference number of loops and a circumferential angle, an upper omit of the preset reference angular range being a product of a sum of the preset reference number of loops and one and the circumferential angle.

10. A terminal, comprising:
a processor;
a touch screen coupled to the processor; and
a memory for storing instructions executable by the processor;
wherein the processor is configured to:
display at least one reference point on the screen;
detect a touch signal corresponding to a touch movement on the screen in a moving direction; and
trigger the terminal to enter into an unlocked state, if the moving direction is the same as a preset reference direction, a number of loops of the touch movement corresponding to the touch signal is the same as a preset reference number of loops, and a number of reference points passed by the touch movement corresponding to the touch signal is the same as a preset reference number of reference points and is greater than one, the number of reference points being greater than one;
wherein:
the preset reference direction is one of a clockwise direction or an anticlockwise direction, and
a determination of whether the number of bops of the touch movement is the same as the preset reference number of bops and a determination of whether the number of reference points passed by the touch movement is the same as the preset reference number of reference points are independent of each other.

11. The device according to claim 10, wherein the at least one reference point includes at least one of a first reference point or a second reference point, the processor being further configured to:
trigger the terminal to enter into the unlocked state, if the first moving direction is the same as the preset reference direction, the number of loops of the touch movement corresponding to the touch signal is the same as the preset reference number of loops, the number of reference points passed by the touch movement corresponding to the touch signal is the same as the preset reference number of reference points, and the touch signal meets at least one of a first condition or a second condition;
wherein the first condition is that an initial location of the touch movement corresponding to the touch signal is a location of the first reference point, and the second condition is that a last reference point passed by the touch movement corresponding to the touch signal after the number of loops is the second reference point.

12. The method according to claim 10, wherein the processor is further configured to:
trigger the terminal to enter into the unlocked state, if the first moving direction is the same as the preset reference direction, the number of loops of the touch movement corresponding to the touch signal is the same as the preset reference number of loops, and the touch movement corresponding to the touch signal passes all preset basis reference points in the displayed at least one reference point.

13. A non-transitory computer-readable storage medium storing therein instructions that, when executed by a processor of a terminal, cause the terminal to perform an unlocking method, the unlocking method comprising:
displaying at least one reference point on the screen;
detecting a touch signal corresponding to a touch movement on a screen of the terminal in a moving direction; and
triggering the terminal to enter into an unlocked state, if the moving direction is the same as a preset reference direction, a number of loops of the touch movement corresponding to the touch signal is the same as a preset reference number of loops, and a number of reference points passed by the touch movement corresponding to the touch signal is the same as a preset reference number of reference points and is greater than one, the number of reference points being greater than one;
wherein:
the preset reference direction is one of a clockwise direction or an anticlockwise direction, and
a determination of whether the number of loops of the touch movement is the same as the preset reference number of loops and a determination of whether the number of reference points passed by the touch movement is the same as the preset reference number of reference points are independent of each other.

* * * * *